(12) United States Patent
Ahn et al.

(10) Patent No.: US 10,407,569 B2
(45) Date of Patent: Sep. 10, 2019

(54) CHLOROETHYLENE-BASED NANOCOMPOSITE COMPOSITION AND METHOD OF PREPARING THE SAME

(71) Applicant: LG CHEM, LTD., Seoul (KR)

(72) Inventors: Seong Yong Ahn, Daejeon (KR); Kun Ji Kim, Daejeon (KR); Se Woong Lee, Daejeon (KR); Kyung Hyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 440 days.

(21) Appl. No.: 14/898,381

(22) PCT Filed: Apr. 10, 2015

(86) PCT No.: PCT/KR2015/003593
§ 371 (c)(1),
(2) Date: Dec. 14, 2015

(87) PCT Pub. No.: WO2015/160145
PCT Pub. Date: Oct. 22, 2015

(65) Prior Publication Data
US 2016/0137827 A1 May 19, 2016

(30) Foreign Application Priority Data

Apr. 14, 2014 (KR) .................. 10-2014-0044088
Apr. 9, 2015 (KR) .................. 10-2015-0050022

(51) Int. Cl.
| | |
|---|---|
| C08L 27/06 | (2006.01) |
| C08K 3/34 | (2006.01) |
| C08J 5/00 | (2006.01) |
| C08L 1/02 | (2006.01) |
| C08L 29/04 | (2006.01) |
| C08L 31/04 | (2006.01) |
| C08L 33/02 | (2006.01) |
| C08K 9/04 | (2006.01) |
| C08L 35/00 | (2006.01) |
| C08F 14/06 | (2006.01) |

(52) U.S. Cl.
CPC ............. *C08L 27/06* (2013.01); *C08F 14/06* (2013.01); *C08J 5/005* (2013.01); *C08K 3/346* (2013.01); *C08K 9/04* (2013.01); *C08L 1/02* (2013.01); *C08L 29/04* (2013.01); *C08L 31/04* (2013.01); *C08L 33/02* (2013.01); *C08L 35/00* (2013.01); *C08J 2323/28* (2013.01); *C08K 2201/011* (2013.01); *C08L 2205/02* (2013.01); *C08L 2205/03* (2013.01)

(58) Field of Classification Search
CPC ...................................................... C08K 3/346
See application file for complete search history.

(56) References Cited

U.S. PATENT DOCUMENTS

| | | | | |
|---|---|---|---|---|
| 5,552,469 | A | * | 9/1996 | Beall ........................ C01B 33/44 501/4 |
| 7,205,351 | B2 | * | 4/2007 | Pritschins ............... B29C 33/60 524/311 |
| 2008/0194736 | A1 | | 8/2008 | Lu |

FOREIGN PATENT DOCUMENTS

| | | | |
|---|---|---|---|
| EP | 0032753 | A2 | 7/1981 |
| IN | 2012206770 | P1 * | 1/2014 |
| KR | 10-2008-0001113 | A | 1/2008 |
| KR | 10-1005547 | B1 | 1/2011 |
| KR | 10-1237758 | B1 | 2/2013 |
| KR | 10-1251727 | B1 | 4/2013 |
| WO | 2014/005753 | A1 | 1/2014 |

OTHER PUBLICATIONS

Derwent abstract 2012-B07077 for KR 10-1251727 B1, published Apr. 10, 2013.*
Machine translation of KR 1005547 B1, published Jan. 5, 2011.*
Huang, Z., et al., "Polymerization in-situ of vinyl chloride with inorganic nanofiller," Poly vinyl Chloride, No. 6, Nov. 2000, Zhejiang University, Hangzhou, China,, pp. 21-24.

* cited by examiner

*Primary Examiner* — Vickey Nerangis
(74) *Attorney, Agent, or Firm* — Dentons US LLP

(57) ABSTRACT

Disclosed are a chloroethylene-based nanocomposite composition comprising a chloroethylene-based resin; a nanoclay comprising a coupling agent bonded thereto; and at least one polymer selected from unsaturated organic acid-based resins or polycarboxylic acid-based resins, and a method of preparing the same.

11 Claims, No Drawings

CHLOROETHYLENE-BASED NANOCOMPOSITE COMPOSITION AND METHOD OF PREPARING THE SAME

This application is a National Stage Entry of International Application No. PCT/KR2015/003593, filed Apr. 10, 2015, and claims the benefit of and priority to Korean Application No. 10-2015-0050022, filed Apr. 9, 2015 and 10-2014-0044088, filed Apr. 14, 2014, all of which are hereby incorporated by reference in their entirety for all purposes as if fully set forth herein.

TECHNICAL FIELD

The present disclosure relates to a chloroethylene-based nanocomposite composition and a method of preparing the same. More particular, the present disclosure relates to a chloroethylene-based nanocomposite composition with superior tensile strength and transparency comprising a chloroethylene-based resin; a nanoclay comprising a coupling agent bonded thereto; and at least one polymer selected from unsaturated organic acid-based resins or polycarboxylic acid-based resins, and a method of preparing the same.

BACKGROUND ART

Chloroethylene-based resins as a representative example of polychloroethylene-based resins are used in a variety of fields since they are cheap and have excellent quality balance.

Chloroethylene-based resins are largely classified into paste resins and straight resins. Paste resins are prepared through emulsion polymerization wherein monomers, water, a surfactant, and the like are homogenized using a homogenization device, and then moved to a polymerization device for polymerization. The polymerized paste resins are used in wallpaper, linoleum, or the like. Straight resins are prepared through suspension polymerization. The straight resins are classified into soft and hard products according to use thereof. General soft products are used in wire clothing, wrap films, sheets, and the like using large amounts of plasticizer. The hard products are used in a variety of fields such as pipes, films, window frames, and the like by adding a variety of additives such as impact modifiers, thermal stabilizers, processing aids, pigments, inorganic filler, and the like.

Chloroethylene-based resins exhibit weak thermal resistance, impact resistance, and mechanical strength. To supplement such problems, thermal stabilizers, impact modifiers, inorganic materials, or the like are added thereto, and, recently, technologies for preparing nanoscale composites using various inorganic materials are being developed.

The nanoscale composites (hereinafter, nanocomposites) are composed of two or more structure or material types, and are materials having nanoscale phase sizes ($10^{-9}$ m). In particular, polymer nanocomposites have transparency, mechanical strength such as tensile strength, and the like dramatically improved by exfoliating and dispersing nanoclave of 1 nm to 500 nm over a polymer material. In addition, polymer nanocomposites may have flexibility and machinability, which are properties of the polymer, and mechanical strength, thermal resistance, and the like, which are properties of nanoclays, at the same time, and as such, receive great attention.

However, nanocomposites can satisfy required properties when a nanomaterial is evenly dispersed over a polymer. In the cases of chloroethylene-based resins, inorganic nanomaterials are not uniformly dispersed and thus it is difficult to prepared nanocomposites, whereby, in most cases, chloroethylene-based inorganic composites are prepared by mechanically mixing general inorganic materials.

DISCLOSURE

Technical Problem

Therefore, the present disclosure has been made in view of the above problems, and it is one object of the present disclosure to provide a chloroethylene-based nanocomposite composition with superior tensile strength and transparency and a method of preparing the same.

The chloroethylene-based nanocomposite composition of the present disclosure comprises a chloroethylene-based resin; a nanoclay comprising a coupling agent bonded thereto; and at least one polymer selected from unsaturated organic acid-based resins or polycarboxylic acid-based resins.

The above and other objects can be accomplished by the present disclosure described below.

Technical Solution

In accordance with one aspect of the present disclosure, provided is a chloroethylene-based nanocomposite composition comprising a chloroethylene-based resin; a nanoclay comprising a coupling agent bonded thereto; and at least one polymer selected from unsaturated organic acid-based resins or polycarboxylic acid-based resins.

In accordance with another aspect of the present disclosure, provided is a method of preparing a chloroethylene-based nanocomposite composition, the method comprising preparing a water dispersion suspension by stirring a nanoclay comprising a coupling agent bonded thereto, at least one polymer selected from unsaturated organic acid-based resins or polycarboxylic acid-based resins, and water; preparing a mixed solution by adding a protective colloidal agent and chloroethylene-based monomer to the water dispersion suspension and mixing the same; and adding an initiator to the mixed solution and suspension-polymerizing the same.

Advantageous Effects

According to the present disclosure as apparent from the fore-going, a uniformly dispersed water dispersion suspension may be provided by enhancing water dispersion effects of the nanoclay, and superior tensile strength may be exhibited by using a uniformly dispersed water dispersion suspension in chloroethylene-based suspension polymerization, and a chloroethylene nanocomposite having superior transparency may be provided.

BEST MODE

Hereinafter, the present disclosure is described in detail.

A chloroethylene-based nanocomposite composition according to the present disclosure comprises a chloroethylene-based resin; a nanoclay comprising a coupling agent bonded thereto; and at least one polymer selected from unsaturated organic acid-based resins or polycarboxylic acid-based resins. Within this range, water dispersion effects of the nanoclay are enhanced, and thus, superior tensile strength and transparency are exhibited.

The expression "coupling agent" used in the chloroethylene-based nanocomposite composition of the present disclosure denotes a material that forms a molecular bridge and provides compatibility by function between two incompatible materials, so long as not specified otherwise.

In an embodiment, the coupling agent may be one or more selected from the group consisting of titanium (Ti)-based, zirconium (Zn)-based and aluminum (Al)-based coupling agents.

In another embodiment, the coupling agent may be represented by Formula 1 below.

[Formula 1]

wherein RO is a hydrolyzed group or a substrate-reactive group, a carbon number of R being less than 14 or 1 to 14, Z is titanium, zirconium or aluminum, X is a phosphate, pyrophosphate, sulfonyl or carboxyl-bonding functional group, R' is a $C_{14}$ or more, or $C_{14}$ to $C_{60}$ aliphatic, naphthenic or aromatic thermoplastic functional group, Y a thermosetting functional group of aryl, methacryl, mercapto or amino, and n is an integer of 1 to 3.

In an embodiment, the nanoclay comprising the coupling agent bonded thereto has a particle diameter of 1 to 300 nm, or 10 to 200 nm. Within this range, tensile strength and transparency are superior.

In an embodiment, the coupling agent may be comprised in an amount of 0.1 to 10 parts by weight, 0.5 to 5 parts by weight, or 1 to 3 parts by weight based on 100 parts by weight of the nanoclay. Within this range, the nanoclay is economical and has superior dispersion effects, tensile strength and transparency.

In an embodiment, the nanoclay comprising the coupling agent bonded thereto may be comprised in an amount of 1 to 20 parts by weight, 2 to 13 parts by weight, or 4 to 15 parts by weight based on 100 parts by weight of the chloroethylene-based monomer. Within this range, tensile strength and transparency are superior.

In an embodiment, the nanoclay comprising the coupling agent bonded thereto may be modified with organic sulfonic acid or organic carboxylic acid, and thus, compatibility with the chloroethylene-based monomer may be further enhanced.

In an embodiment, in the nanoclay, a weight ratio of a large particle having a particle diameter of 100 nm or more to a minute particle having a particle size of 5 nm or less may be 95:5 to 99:1. Within this range, superior property balance is exhibited.

In an embodiment, the unsaturated organic acid-based resin may be one or more selected from the group consisting of acrylic acid resins, methacrylic acid resins, itaconic acid resins, fumaric acid resins, maleic acid resins, succinic acid resins, oleic acid resins and gelatin.

The polycarboxylic acid-based resin is a single polymer or a resin, a main chain of which comprises a compound represented by Formula 2 below:

Formula 2

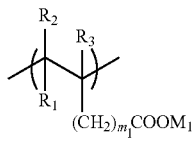

wherein each of $R_1$, $R_2$, and $R_3$ is hydrogen or a $C_1$ to $C_5$ alkyl group, $M_1$ is hydrogen, an alkali metal, an alkali earth metal, a $C_1$ to $C_{10}$ alkylammonium group, or a $C_1$ to $C_{10}$ alkyl alcohol ammonium group, and $m_1$ is an integer of 0 to 2.

In addition, in $M_1$, the alkali metal, for example, is sodium or potassium, the alkali earth metal, for example, is magnesium or calcium, and the C1 to C10 alkylammonium group is, for example, dimethylammonium, methyl ethyl ammonium, diethylemmonium, trimethylammonium, trimethylammonium, or tetramethylammonium. In this case, water dispersion effects are improved and superior property balance is exhibited.

The C1 to C10 alkyl alcohol ammonium group, for example, may be triethanolammonium or diisopropylammonium. In this case, water dispersion effects are improved and superior property balance is exhibited.

In an embodiment, the polycarboxylic acid-based resin may be a polymer polymerized with one or more selected from the group consisting of carboxylic acid, acrylic acid, methyl (meth) acrylic acid, ethyl (meth) acrylic acid, trimethylacrylic acid, maleic acid, fumaric acid, itaconic acid, crotonic acid, citraconic acid, vinyl acetate, 4-pentanoic acid and salts thereof (but, the polycarboxylic acid-based resin is not the same as the unsaturated organic acid-based resin).

In addition, a weight average molecular weight of the polycarboxylic acid based resin may, for example, be 10,000 to 100,000 g/mol, or 30,000 to 70,000 g/mol. Within this range, dispersion effects of the nanoclay are superior and the polycarboxylic acid-based resin exhibits superior compatibility with the chloroethylene-based monomer.

In an embodiment, the at least one polymer selected from unsaturated organic acid-based resins or polycarboxylic acid-based resins is comprised in an amount of 0.1 to 18 parts by weight, 0.1. to 15 parts by weight, 0.5 to 12 parts by weight, or 2 to 8 parts by weight based on 100 parts by weight of the nanoclay comprising the coupling agent bonded thereto. Within this range, the amount of the unsaturated organic acid-based resin or the polycarboxylic acid-based resin remaining in the chloroethylene-based nanocomposite is decreased, whereby dispersion effects of the nanoclay are superior and whiteness or transparency is enhanced.

In an embodiment, a method of preparing chloroethylene-based nanocomposite composition using the chloroethylene-based nanocomposite composition comprising preparing a water dispersion suspension by stirring a nanoclay comprising a coupling agent bonded thereto, at least one polymer selected from unsaturated organic acid-based resins or polycarboxylic acid-based resins, and water; preparing a mixed solution by adding a protective colloidal agent and chloroethylene-based monomer to the water dispersion suspension and mixing the same; and adding an initiator to the mixed solution and suspension-polymerizing the same.

In an embodiment, the water dispersion suspension may comprise 1 to 20 parts by weight or 3 to 12 parts by weight of the nanoclay comprising the coupling agent bonded thereto based on 100 parts by weight of water. Within this range, property balance is superior and nanoclay dispersion effects are enhanced during suspension polymerization, thereby enhancing properties of the chloroethylene-based nanocomposite.

In an embodiment, the water dispersion suspension may comprise 0.01 to 1.5 parts by weight or 0.05 to 0.5 parts by weight of at least one polymer selected from unsaturated organic acid-based resins or polycarboxylic acid-based resins based on 100 parts by weight of water. Within this range, property balance is superior and the nanoclay exhibits superior dispersion effects.

The water dispersion suspension may be used in suspension polymerization of the chloroethylene-based monomer to prepare a straight chloroethylene-based nanocomposite.

In an embodiment, in a step of preparing the Water dispersion suspension, stirring is carried out for 0.1 to 3 hours or 0.5 to 1.5 hours.

In an embodiment, the mixed solution may comprise 100 to 200 parts by weight of the water dispersion suspension, 0.001 to 5 parts by weight of the protective colloidal agent and 0.0001 to 0.5 parts by weight of the initiator based on 100 parts by weight of the chloroethylene-based monomer.

The protective colloidal agent, for example, is used in an amount of 0.001 to 5 parts by weight or 0.01 to 2 parts by weight. Within this range, protective colloidal properties are satisfactory and formation of microparticles or coarse particles is reduced. As a result, particle formation is stabilized.

In an embodiment, the protective colloidal agent is at least one selected from the group consisting of a vinyl alcohol based resin, a hydration degree of which is to 98% by weight and a viscosity of a 4% aqueous solution of which is 5 to 100 cps at room temperature, cellulose, which comprises 15 to 40% by weight of a methoxy group and 3 to 20% by weight of a hydroxypropyl group and 2% aqueous solutions of which has viscosity of to 20,000 cP at room temperature, and unsaturated organic acid. The protective colloidal agent may be particularly a vinyl alcohol based resin having a hydration degree of 70 to 98%, a vinyl alcohol based resin having a hydration degree of to 60%, or a mixture thereof. More particularly, the protective colloidal agent may be a vinyl alcohol based resin having a hydration degree of 85 to 98%, vinyl alcohol based resin having a hydration degree of 50 to 60%, or a mixture thereof.

In an embodiment, the initiator may be one or more selected from the group consisting of diacyl peroxides, peroxydicarbonates, peroxyesters, azo compounds and sulfates.

The chloroethylene-based monomer may be only chloroethylene-based monomer, or a mixture that comprises the vinyl-based monomer polymerizable with the chloroethylene-based monomer. In the case of the mixture, the amount of the chloroethylene-based monomer is preferably 50 wt % or more.

In an embodiment, the vinyl based monomer copolymerizable with the chloroethylene-based monomer may, for example, be an olefin compound such as ethylene, propylene, or the like; a vinyl ester such as vinyl acetate, propionic acid vinyl, or the like; an unsaturated nitrile such as acrylonitrile or the like; or a vinyl alkyl ether such as vinyl methyl ether, vinyl ethyl ether, or the like. At least one selected from the compounds may be used by mixing with the chloroethylene-based monomer.

In an embodiment, the suspension polymerization may be terminated by adding a reaction terminator. A resultant slurry may be dried through a general drying method. Reaction termination may be carried out when pressure of a reactor is 6 to 8 kg/cm$^2$, i.e., when a polymerization transition rate is 80 to 90% or 83 to 88%.

The reaction terminator may be any one generally used in preparation of chloroethylene-based resins. For example, the reaction terminator may be a phenolic compound, amine compound, nitrite compound, or sulfur compound.

The phenolic compound, for example, may be triethyleneglycol-bis-3-(3-t-butyl-4-hydroxy-5-methylphenyl)propionate, hydroquinone, p-methoxy phenol, t-butylhydroxyanisole, n-octadecyl-3-(4-hydroxy-3,5-di-t-butylphenyl) propionate, 2,5-di-t-butylhydroquinone, 4,4-butylidenebis (3-methyl-6-t-butyl phenol), t-butyl catechol, 4,4-thiobis(6-t-butyl-m-cresol), or tocopherol. The amine compound may, for example, be N,N-diphenyl-p-phenylenediamine or 4,4-bis(dimethylbenzyl)diphenylamine. The nitrite compound, for example, may be 2-phenyl nitronyl nitroxide, 3-imidazolinenitroxide, or 4-hydroxy-2,2,6,6-tetramethyl-piperidine-1-oxyl. The sulfur compound, for example, may be dodecyl mercaptan or 1,2-diphenyl-2-thiol. At least one selected from the compounds may be used.

Additionally, a polymerization regulator, a chain-transfer agent, a pH adjuster, an antioxidant, a crosslinking agent, an antistatic agent, a scale inhibitor, a surfactant, or the like may be dividedly or continuously added before polymerization initiation, after polymerization, or during polymerization.

The method of preparing the chloroethylene-based nanocomposite composition through suspension polymerization of the present disclosure, for example, may be a method of preparing the chloroethylene-based nanocomposite by preparing a nanoclay suspension comprising an unsaturated organic acid or a polycarboxylic acid based polymer and by suspension polymerizing chloroethylene-based monomer while maintaining polymerization reference temperature according to a target average polymerization temperature during an overall reaction process in the presence of a protective colloidal agent and a polymerization initiator.

The polymerization reference temperature is determined according to a target average polymerization degree and a range of the polymerization reference temperature is 30 to 80° C.

Since the polymerization reference temperature depends on characteristics of equipment or manufacturers, it is difficult to individually select conditions in all cases for a target average polymerization degree. For example, the polymerization reference temperature is 63 to 65° C. when the target average polymerization degree is 800, polymerization reference temperature is 60 to 62° C. when the target average polymerization degree is 900, polymerization reference temperature is 56 to 58° C. when the target average polymerization degree is 1000, polymerization reference temperature is 52 to 54° C. when the target average polymerization degree is 1300, and polymerization reference temperature is 47 to 49° C. when the target average polymerization degree is 1700. In addition, when polymerization reference temperature is less than 30° C. or greater than 80° C., a target average polymerization degree may be less than 700 or greater than 1700.

In addition, a polymerization degree of the chloroethylene-based nanocomposite composition may be varied according to polymerization temperature and, for example, may be 680 to 2500, or 680 to 1100.

The reactor used in the present disclosure may be a stirring device that is generally used to suspension-polymerize chloroethylene-based resins. For example, as the stirring device, a stirring device, a wing of which is a paddle type, a pitched paddle type, bloomers gin type, a Pfaudler type, a turbine type, a propeller type, or a combination thereof may be used. As a baffle type, a plate type, a cylindrical type, a D type, a loop type, or a finger type may be used.

Water of a slurry of the chloroethylene-based nanocomposite composition is removed using a fluidized bed dryer under general, reaction conditions, thereby preparing a chloroethylene-based nanocomposite composition.

According to the present disclosure, a chloroethylene-based nanocomposite composition comprising a uniformly dispersed nanoclay therein may be provided.

In addition, provided is a chloroethylene-based nanocomposite prepared according to the method of preparing the chloroethylene-based nanocomposite composition.

Although the preferred embodiments of the present disclosure are disclosed for illustrative purposes, those skilled in the art will appreciate that various modifications, additions and substitutions are possible, without departing from the scope and spirit of the invention as disclosed in the accompanying claims.

Preparation of Nanoclay Comprising Coupling Agent Bonded Thereto

A nanoclay comprising a coupling agent bonded thereto was prepared by preparing a sludgy through dispersion of a commercially available nanoclay in water or an organic solvent, and adding a commercially available coupling agent thereto while stirring the same, followed by filtering and drying.

EXAMPLE 1

390 kg of deionized water, 1.5 kg of polyfumaric acid as a polycarboxylic acid-based resin, and 30 kg of a nanoclay (titanium IV 2,2 (bis 2-propenolatomethyl)butanolato, tris (dioctyl) pyrophosphato-O) comprising a titanium-based coupling agent thereto and having a particle diameter of 80 nm were added to a reactor having an inner volume of 1 m$^3$ and equipped with a reflux condenser, and then stirred for 1 hour, to prepare a water dispersion suspension.

With the resultant water dispersion suspension, polyvinyl alcohol having a hydration degree of 87.5% was added in an amount of 150 g and hydroxypropylmethyl cellulose was added in an amount of 150 g to the reactor. Subsequently, 300 kg of a chloroethylene-based monomer was added thereto and then stirred for 1 hour, to prepare a solution. Subsequently, 30 g of di-2-ethylhexylperoxydicarbonate and 120 g of t-butylperoxy neodecanoate were added thereto and then suspension polymerization was initiated.

In order to achieve a target average polymerization degree of 800 during an overall polymerization process, reaction was carried out while maintaining 65° C. In addition, when a polymerization reactor pressure reached 8.0 kg/cm$^2$, 15 g of 4-hydroxy-2,2,6,6-tetramethyl-piperidine-1-oxyl and 60 g of triethyleneglycol-bis-3-(3-t-butyl-4-hydroxy-5-methyl-phenyl)propionate as reaction terminators were added to the reactor and then unreacted monomers were collected. A resin slurry was collected from the polymerization reactor.

The obtained slurry was dried in a fluidized bed dryer through a general method. As a result, a chloroethylene-based nanocomposite composition was obtained.

EXAMPLE 2

Polymerization was carried out under the same conditions as in Example 1, except that 40 kg of nanoclay (Zirconium IV 2,2 (bis-2-propenolatomethyl)butanolato, tri(dioctyl)pyrophosphato-O) including a zirconium-based coupling agent bonded thereto and having a particle diameter of 120 nm instead of the nanoclay including the titanium-based coupling agent bonded thereto and having a particle diameter of 80 nm, and 1.5 kg of polymaleic acid vinyl acetate as an unsaturated organic acid resin were used, thereby obtaining a chloroethylene-based nanocomposite composition.

EXAMPLE 3

Polymerization was carried out under the same conditions as in Example 1, except that 20 kg of nanoclay (di-isopropyl (oleyl)aceto aluminate, isopropyl bistearyl aluminate) having a particle diameter of 80 nm and including aluminum-based coupling agent bonded thereto instead of the nanoclay including the titanium-based coupling agent bonded thereto and having a particle diameter of 80 nm, and 1.0 kg of polyacrylic acid as an unsaturated organic acid resin was used, thereby obtaining a chloroethylene-based nanocomposite composition.

EXAMPLE 4

Polymerization was carried out under the same conditions as in Example 1, except that 15 kg of a nanoclay including a titanium-based coupling agent bonded thereto and having a particle diameter of 120 nm instead of the nanoclay including the titanium-based coupling agent bonded thereto and having a particle diameter of 80 nm, and 1.0 kg of polyfumaric acid as an unsaturated organic acid resin were used, thereby obtaining a chloroethylene-based nanocomposite composition.

EXAMPLE 5

Polymerization was carried out under the same conditions as in Example 1, except that 30 kg of a nanoclay including a titanium-based coupling agent bonded thereto and having a particle diameter of 40 nm instead of the nanoclay including the titanium-based coupling agent bonded thereto and having a particle diameter of 80 nm, and 200 g of polyacrylic acid were used, thereby obtaining a chloroethylene-based nanocomposite composition.

EXAMPLE 6

Polymerization was carried out under the same conditions as in Example 1, except that 30 kg of a nanoclay including a titanium-based coupling agent bonded thereto and having a particle diameter of 40 nm instead of the nanoclay including the titanium-based coupling agent bonded thereto and having a particle diameter of 80 nm, and 5 kg of polyacrylic acid were used, thereby obtaining a chloroethylene-based nanocomposite composition.

COMPARATIVE EXAMPLE 1

390 kg of deionized water, 150 g of polyvinyl alcohol having a hydration degree of 78%, 120 g of polyvinyl alcohol having a hydration degree of 40% and 30 g of hydroxypropylmethyl cellulose were added batchwise to a reactor having an inner volume of 1 m$^3$ and equipped with reflux condenser, and then 30 g of di-2-ethylhexylperoxydicarbonate and 120 g of t-butylperoxy neodecanoate were added thereto. Subsequently, in order to achieve a target average polymerization degree 800, reaction was carried cut while maintaining 65☐ during an overall polymerization process.

When a polymerization reactor pressure reached at 8.0 kg/cm$^2$, 15 g of 4-hydroxy-2,2,6,6-tetramethyl-piperidine-1-oxyl and 60 g of triethyleneglycol-bis-3-(3-t-butyl-4-hydroxy-5-methylphenyl)propionate as reaction terminators were added to the reactor and then unreacted monomers were collected. A resin slurry was collected from the polymerization reactor. The obtained slurry was dried in a fluidized bed dryer through a general method. As a result, a chloroethylene-based resin was obtained.

COMPARATIVE EXAMPLE 2

A chloroethylene-based resin was obtained under the same conditions as in Example 1, except that 20 kg of nanoclay not including coupling agent and having particle diameter of 80 nm instead of the nanoclay including the titanium-based coupling agent bonded thereto and having a particle diameter of 80 nm, and 1.0 kg of polyfumaric acid as an unsaturated organic were used.

COMPARATIVE EXAMPLE 3

A chloroethylene-based resin was obtained under the same conditions as in Example 1, except that 30 kg of a nanoclay not including a coupling agent and having a particle diameter of 120 nm instead of the nanoclay including the titanium-based coupling agent bonded thereto and having a particle diameter of 80 nm, and 1.0 kg of polyfumaric acid as an unsaturated organic acid resin were used.

COMPARATIVE EXAMPLE 4

Reaction was carried out under the same conditions as in Example 1, except that the unsaturated organic acid-based resin or the polycarboxylic acid-based resin was not used. However, mass scale was generated during polymerization and thus polymerization was failed, whereby property measurements were impossible.

REFERENCE EXAMPLE 1

Polymerization was carried out under the same conditions as in Example 1, except that 20 kg of nanoclay including a titanium-based coupling agent bonded thereto and having a particle diameter of 40 nm instead of the nanoclay including the titanium-based coupling agent bonded thereto and having a particle diameter of 80 nm, and 15 g of polymaleic acid vinyl acetate were used, thereby obtaining a chloroethylene-based nanocomposite composition.

Properties of the chloroethylene-based nanocomposite compositions prepared according to Examples 1 to 6, Comparative Examples 1 to 4 and Reference Example 1, and results of specimens thereof are summarized in Table 1 below.

Measurement of polymerization degree: Measured according to ASTM D1 243-79.

Measurement of apparent specific gravity: Measured according to ASTM D1 895-89.

Adhered scale state: An adhered scale state in a polymerization reactor was observed with the naked eye and evaluated as follows.

o: Adhered scale is not observed.
Δ: Small amount of adhered scale is observed.
X: Large amount of adhered scale is observed.

Measurement of tensile strength: 5 parts by weight of a mixed stabilizer (WPS-60) including a thermal stabilizer and a lubricant, 1.5 parts by weight of a processing aid (PA-828) and 2 parts by weight of titanium oxide were added to a chloroethylene-based resin, based on 100 parts by weight of the chloroethylene-based resin. A resultant mixture was calendered at 185□ for five minutes using a roll mill and then compressed at 185□ for two minutes under a pressure of 10 K/G using a press, thereby preparing a hard specimen. An obtained specimen was subjected to tensile strength measurement according to ASTM 0638.

Transparency evaluation: 4 parts by weight of a tin-based stabilizer, 1 part by weight of a processing aid (PA-910), 6 parts by weight of an impact modifier (MB872) and 0.5 parts by weight of a lubricant (SL63) were mixed with the obtained resin, based on 100 parts by weight of the resin. A resultant mixture was kneaded using a roll at 185□ for five minutes, thereby obtaining a sheet. The sheet was cut, laminated, and compressed by press-molding, thereby preparing a compressed sheet. The compressed sheet was measured using a WYK-Gardner (model name: Haze-gard plus).

Particle diameter: Measured using TEM.

TABLE 1

| Units | Measured items | | | | |
|---|---|---|---|---|---|
| | Polymerization degree | Apparent specific gravity g/cc | Scale state | Tensile strength kgf/cm$^2$ | Transparency |
| Example 1 | 801 | 0.637 | ○ | 755 | 81.1 |
| Example 2 | 799 | 0.657 | ○ | 780 | 82.6 |
| Example 3 | 800 | 0.630 | ○ | 720 | 78.8 |
| Example 4 | 803 | 0.617 | ○ | 695 | 79.4 |
| Example 5 | 802 | 0.646 | Δ | 740 | 82.0 |
| Example 6 | 803 | 0.643 | ○ | 785 | 74.6 |
| Comparative Example 1 | 800 | 0.532 | ○ | 525 | 73.1 |
| Comparative Example 2 | 802 | 0.572 | Δ | 635 | 76.8 |
| Comparative Example 3 | 801 | 0.581 | Δ | 650 | 77.4 |
| Comparative Example 4 | Polymerization is failed | | | | |
| Reference Example 1 | Over-size | — | X | — | — |

As shown in Table 1, in Examples 1 to 6 including the chloroethylene-based resin according to the present disclosure; a nanoclay comprising a coupling agent bonded thereto; and at least one polymer selected from unsaturated organic acid-based resins or polycarboxylic acid-based resins, a high apparent specific gravity is observed, adhered scale is not observed, and greatly enhanced tensile strength and transparency are exhibited.

On the other hand, in Comparative Example 1 that does not include the nanoclay comprising the coupling agent bonded thereto and the unsaturated organic acid-based resin or the polycarboxylic acid-based resin, an apparent specific gravity, tensile strength and transparency are greatly deteriorated.

In addition, in Comparative Examples 1 and 3 in which the nanoclay not including the coupling agent is used, an apparent specific gravity, a scale state, tensile strength and transparency are deteriorated. Furthermore, in Comparative Example 4 in which the nanoclay comprising the coupling agent bonded thereto is used, but the unsaturated organic acid-based resin or the polycarboxylic acid-based resin is not included, massive scale is generated during polymerization and thus polymerization fails.

What is claimed is:

1. A chloroethylene-based nanocomposite composition comprising:
   i) a chloroethylene-based resin formed from chloroethylene-based monomer;
   ii) a nanoclay comprising a coupling agent bonded thereto; and
   iii) at least one polymer selected from unsaturated organic acid resin or polycarboxylic acid resin,
   wherein an amount of the at least one polymer selected from unsaturated organic acid resin or polycarboxylic acid resin is 0.1 to 8 parts by weight based on 100 parts by weight of the nanoclay comprising the coupling agent bonded thereto, wherein the coupling agent comprises Formula 1 below:

 [Formula 1]

wherein RO is a hydrolyzed group or a substrate-reactive group, a carbon number of R being less than 14 or 1 to 14, Z is titanium, zirconium or aluminum, X is a phosphate, pyrophosphate, sulfonyl or carboxyl-bonding functional group, R' is a $C_{14}$ or more, or $C_{14}$ to $C_{60}$ aliphatic, naphthenic or aromatic thermoplastic functional group, Y is a thermosetting functional group of aryl, methacryl, mercapto or amino, and n is an integer of 1 to 3, wherein the unsaturated organic acid resin is one or more selected from the group consisting of acrylic acid resins, methacrylic acid resins, itaconic acid resins, fumaric acid resins, maleic acid resins, succinic acid resins, oleic acid resins and gelatin, and wherein the polycarboxylic acid resin is a single polymer or a resin, a main chain of which comprises Formula 2 below:

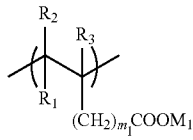

Formula 2 wherein each of $R_1$, $R_2$, and $R_3$ is hydrogen or a $C_1$ to $C_5$ alkyl group, $M_1$ is hydrogen, an alkali metal, an alkali earth metal, a $C_1$ to $C_{10}$ alkylammonium group, or a $C_1$ to $C_{10}$ alkyl alcohol ammonium group, and $m_1$ is an integer of 0 to 2.

2. The chloroethylene-based nanocomposite composition according to claim 1, wherein a particle diameter of the nanoclay comprising the coupling agent bonded thereto is 1 to 300 nm.

3. The chloroethylene-based nanocomposite composition according to claim 1, wherein the nanoclay comprising the coupling agent bonded thereto is modified with organic sulfonic acid or organic carboxylic acid.

4. The chloroethylene-based nanocomposite composition according to claim 1, wherein the coupling agent is comprised in an amount of 0.1 to 10 parts by weight based on 100 parts by weight of the nanoclay.

5. The chloroethylene-based nanocomposite composition according to claim 1, wherein the nanoclay comprising the coupling agent bonded thereto is comprised in an amount of 1 to 20 parts by weight based on 100 parts by weight of the chloroethylene-based monomer.

6. The chloroethylene-based nanocomposite composition according to claim 1, wherein the polycarboxylic acid resin is a polymer polymerized with one or more selected from the group consisting of carboxylic acid, acrylic acid, methyl (meth)acrylic acid, ethyl(meth)acrylic acid, trimethylacrylic acid, maleic acid, fumaric acid, itaconic acid, crotonic acid, citraconic acid, 4-pentanoic acid and salts thereof.

7. A method of preparing the chloroethylene-based nanocomposite composition of claim 1, the method comprising:
    preparing a water dispersion suspension by stirring the nanoclay comprising the coupling agent bonded thereto, the at least one polymer selected from unsaturated organic acid resin or polycarboxylic acid resin, and water;
    preparing a mixed solution by adding a protective colloidal agent and chloroethylene- based monomer to the water dispersion suspension and mixing the same; and
    adding an initiator to the mixed solution and suspension-polymerizing the same.

8. The method according to claim 7, wherein the water dispersion suspension comprises 1 to 20 parts by weight of the nanoclay comprising the coupling agent bonded thereto and 0.01 to 1.5 parts by weight of the at least one polymer selected from unsaturated organic acid resin or polycarboxylic acid resin based on 100 parts by weight of water.

9. The method according to claim 7, wherein the mixed solution comprises 100 to 200 parts by weight of the water dispersion suspension, 0.001 to 5 parts by weight of the protective colloidal agent and 0.0001 to 0.5 parts by weight of the initiator based on 100 parts by weight of the chloroethylene-based monomer.

10. The method according to claim 7, wherein the protective colloidal agent is at least one selected from the group consisting of a vinyl alcohol based resin, a hydration degree of which is 30 to 98% by weight and a viscosity of a 4% aqueous solution of which is 5 to 100 cP at room temperature, cellulose, which comprises 15 to 40% by weight of a methoxy group and 3 to 20% by weight of a hydroxypropyl group and 2% aqueous solutions of which is viscosity of 10 to 20,000 cP at room temperature, and unsaturated organic acid.

11. The method according to claim 7, wherein the initiator is one or more selected from the group consisting of diacyl peroxides, peroxydicarbonates, peroxyesters, azo compounds and sulfates.

* * * * *